(12) United States Patent
Kusama

(10) Patent No.: US 7,085,767 B2
(45) Date of Patent: Aug. 1, 2006

(54) DATA STORAGE METHOD AND DEVICE AND STORAGE MEDIUM THEREFOR

(75) Inventor: Kiyoshi Kusama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 363 days.

(21) Appl. No.: 09/983,723

(22) Filed: Oct. 25, 2001

(65) Prior Publication Data

US 2002/0055943 A1    May 9, 2002

(30) Foreign Application Priority Data

Oct. 27, 2000  (JP)  ............................ 2000-329603
Sep. 27, 2001  (JP)  ............................ 2001-296767

(51) Int. Cl.
G06F 17/30    (2006.01)

(52) U.S. Cl. .................. 707/101; 707/102; 707/103 R; 707/104.1; 348/232; 348/231.2

(58) Field of Classification Search ................ 707/205, 707/200, 201, 202, 101, 102, 103 R, 104.1, 707/10, 1; 348/231.6, 231.2, 231.3, 232; 715/734, 500
See application file for complete search history.

(56) References Cited

U.S. PATENT DOCUMENTS

| | | | | |
|---|---|---|---|---|
| 5,255,389 | A * | 10/1993 | Wang ........................... | 707/10 |
| 5,933,599 | A * | 8/1999 | Nolan ........................ | 715/734 |
| 6,185,550 | B1 * | 2/2001 | Snow et al. ..................... | 707/1 |
| 6,263,402 | B1 * | 7/2001 | Ronstrom et al. .......... | 711/131 |
| 6,301,586 | B1 * | 10/2001 | Yang et al. ............... | 707/104.1 |
| 6,460,055 | B1 * | 10/2002 | Midgley et al. ............. | 707/204 |
| 6,567,918 | B1 * | 5/2003 | Flynn et al. ................ | 713/200 |
| 6,625,623 | B1 * | 9/2003 | Midgley et al. ............. | 707/204 |
| 6,704,712 | B1 * | 3/2004 | Bleiweiss ..................... | 705/26 |
| 6,741,996 | B1 * | 5/2004 | Brechner et al. ........... | 707/102 |
| 6,812,961 | B1 * | 11/2004 | Parulski et al. .......... | 348/231.2 |
| 6,812,962 | B1 * | 11/2004 | Fredlund et al. ......... | 348/231.2 |
| 2001/0025256 | A1 * | 9/2001 | Oliphant et al. .............. | 705/26 |
| 2002/0054224 | A1 * | 5/2002 | Wasula et al. .............. | 348/232 |
| 2003/0048364 | A1 * | 3/2003 | Ohmura .................... | 348/231.6 |
| 2005/0154971 | A1 * | 7/2005 | Nagao ........................ | 715/500 |

FOREIGN PATENT DOCUMENTS

JP        2001-14196           1/2001
JP        2001075846 A  *   3/2001

* cited by examiner

Primary Examiner—Thuy N. Pardo
(74) Attorney, Agent, or Firm—Fitzpatrick, Cella, Harper & Scinto

(57) ABSTRACT

There is provided a binary data storage method and device and a storage medium which, upon duplicating binary data stored in an external storage medium into a data storage device, is capable of generating inside the data storage device a folder having a name which is appropriate for the data without the user having to perform manipulations or confirm the content of the data. The existence of still image data inside a memory card is confirmed and the existence of meta data inside the memory card is confirmed, a folder having a name based on the meta data is generated in a HDD inside the binary data storage device, the still image data inside the memory card is read out and the still image data is duplicated into the generated folder, producing the result that when the still image data inside the memory card is duplicated or stored into the binary data storage device a folder having a name which is appropriate for the data is generated inside the binary data storage device without the user having to perform manipulations or confirm the content of the data.

21 Claims, 16 Drawing Sheets

Get Ready!

Title — Party — 801

Date — 2000-10-11 — 802

Location — Toky_ — 803

By — Kiyoshi Kusama — 804

```
<?xml version="1.0"encoding="Shift_JIS"?>
<PHOTO>
    <ITEM ATTR="Title">Party</ITEM>
    <ITEM ATTR="Date">2000-10-11</ITEM>
    <ITEM ATTR="Location">Tokyo</ITEM>
    <ITEM ATTR="Photographer">Kiyoshi Kusama</ITEM>
</PHOTO>
```

FIG. 13

| Number | Name |
|---|---|
| 1 | CAMEL |
| 2 | OSTRICH |
| 3 | ZEBRA |
| 4 | BUFFALO |
| 5 | TIGER |
| 6 | ELEPHANT |
| 7 | GIRAFFE |
| 8 | LEOPARD |
| 9 | LION |
| ............ | ................................ |

DATA STORAGE METHOD AND DEVICE AND STORAGE MEDIUM THEREFOR

BACKGROUND OF THE INVENTION

1. Field of the Invention

The present invention relates to a data storage method, a device to store data therein and a storage medium.

2. Related Background Art

Conventionally, in a digital camera, a digital video camera and other such image input devices, the inputted still image data, motion image data, voice data or other such binary data is either stored in a memory unit (i.e., memory) mounted into the device, or is stored in a detachable medium (i.e., external storage medium) such as a memory card, a PC card, or the like. When binary data stored in a medium such as those is to be used, the medium in which the binary data was stored is inserted into a personal computer (PC), or the image input device is connected directly to the PC, the binary data is read out, and the necessary processing is performed with the data.

However, when the binary data described above is read from the medium, the file name of the binary data file has been automatically assigned on the image input device side, and so there was the problem in that it could not be readily understood from the file name alone when and how the data was generated.

In order to deal with this problem, the user generally adopted a method in which a folder having an appropriate folder name was generated on the PC, and duplicated (i.e., copied) all of the binary data into that folder, whereby a folder name which could be easily understood was given to the data. According to this method, in order to generate the name for the folder it was necessary to confirm the content of the data to be copied, and this operation was a burden, so it was not uncommon to copy the data without generating a folder name.

SUMMARY OF THE INVENTION

The present invention has been made in view of the above, and therefore an objective of the present invention is to provide a binary data storage method and device, and a storage medium, which, upon duplicating binary data stored in an external storage medium into a data storage device, are capable of generating inside the data storage device a folder having a name which is appropriate for the data without the user having to perform manipulations or confirm the content of this data.

According to a first aspect of the present invention, there is provided a data storage method for storing into a data storage device binary data that was stored in an external storage medium, the method including:

a binary data confirmation process for confirming the existence of the binary data inside the external storage medium;

a meta data confirmation process for confirming the existence of meta data inside the external storage medium;

a folder generation process for generating inside the data storage device a folder having a name based on the confirmed meta data;

a binary data read-out process for reading out the confirmed binary data; and a binary data duplication process for duplicating into the generated folder the binary data which has been read out.

BRIEF DESCRIPTION OF THE DRAWINGS

FIG. 8 is an outline diagram of an input screen displayed on a display part, for inputting the meta data in the process for FIG. 7;

FIG. 10 is an outline diagram depicting an example description of the meta data stored in the memory card depicted in FIG. 2;

FIG. 13 is an outline diagram of a data base necessary for the generation of the folder name in the process depicted in FIG. 12;

DESCRIPTION OF THE PREFERRED EMBODIMENTS

Hereinafter, explanation will be made of embodiments of the present invention, making reference to the drawings.

First Embodiment

Figure 1:
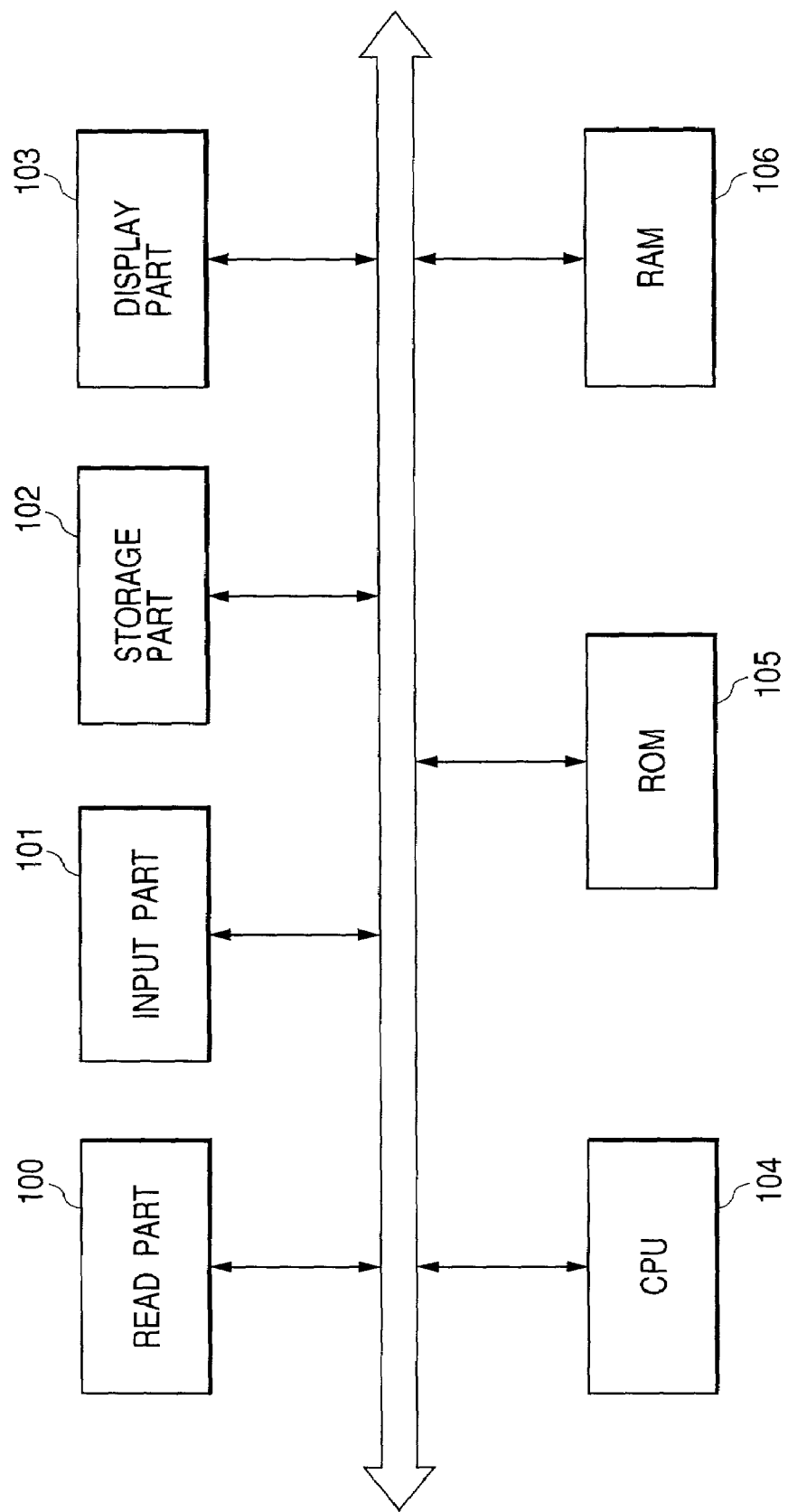
FIG. 1 is a block diagram depicting an outline construction of a binary data storage device according to the First Embodiment of the present invention.

FIG. 1 is a block diagram depicting an outline construction of a binary data storage device according to First Embodiment of the present invention.

In FIG. 1, a read part 100 is an entity (input) device for reading predetermined kinds of data, and it is for reading image data which has been read by a scanner (not shown), or binary data or meta data which has been stored in a memory card, a PC card, or other such external memory medium. An input part 101 comprises a keyboard, mouse and/or other such pointing device (not shown), and it is for receiving data input made by a user. A storage part 102 is an entity (input) device for storing inputted binary data, for example, and it is mainly comprised of a hard disk (HDD) or other such memory device. A display part 103 either displays the binary data stored in the storage part 102 or displays the image data which has been read by the read part 100, and it is comprised of a CRT, a liquid crystal display, a TV or other such display devices.

Figure 4:
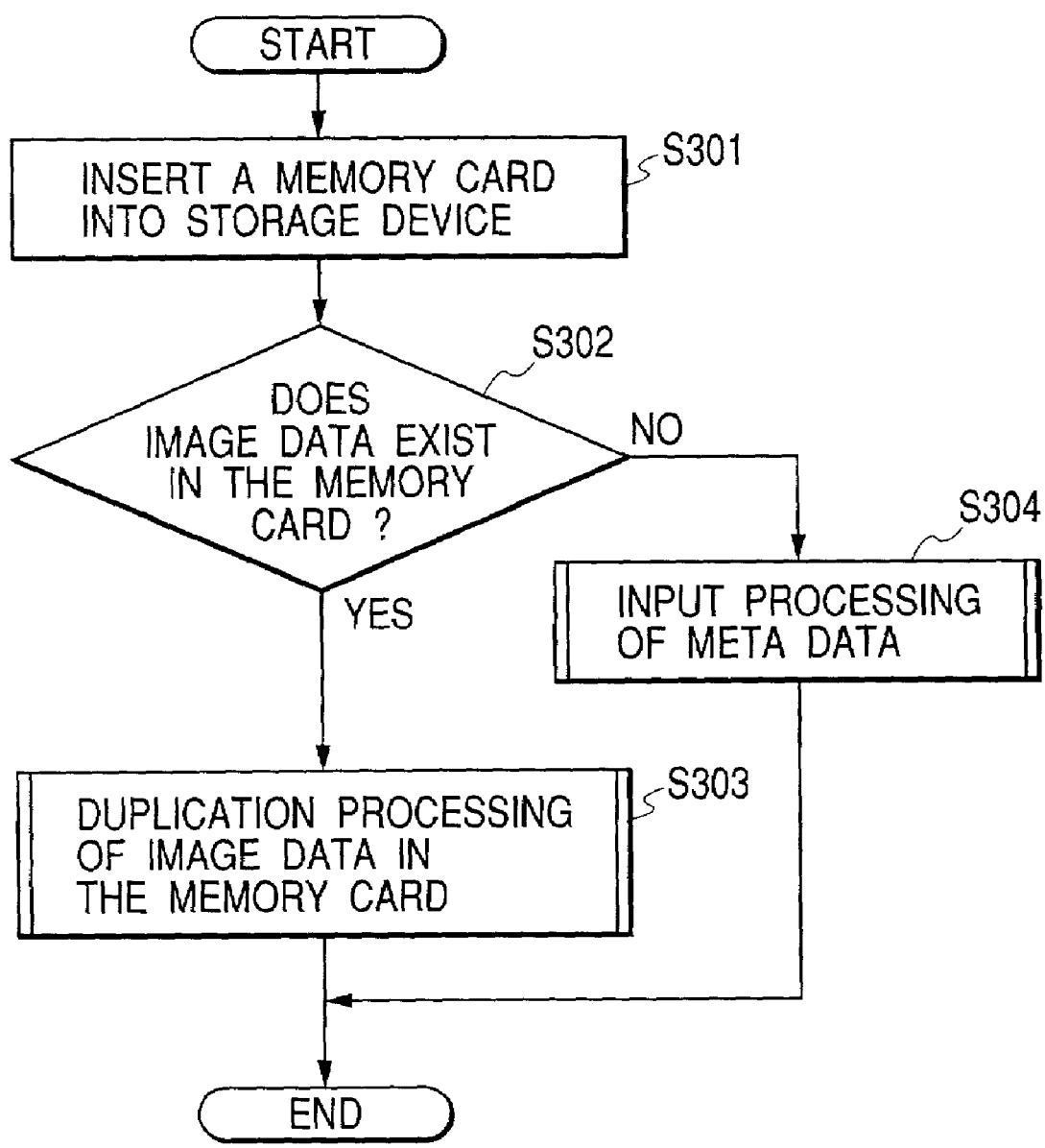
FIG. 4 is a flow chart depicting a process for duplicating image data from the memory card of FIG. 2 to a storage part.

A CPU 14 performs control processes necessary for each part of the device, including the above-mentioned read part 100, input part 101, storage part 102 and display part 103. A ROM 105 and RAM 106 are memories for providing memory space and operational space (i.e., temporary memory space) necessary for a given process. Further, a control program for realizing the control process described below and depicted in FIG. 4, is stored in the ROM 105. The read part 100, the input part 101, the storage part 102, the display part 103, the CPU 104, the ROM 105 and the RAM 106 are connected to each other by means of a system bus.

The binary data storage device according to the present embodiment has various constituting elements provided other than the ones mentioned above; however, these are not the focus of the present invention, so their explanations are omitted.

Figure 2:
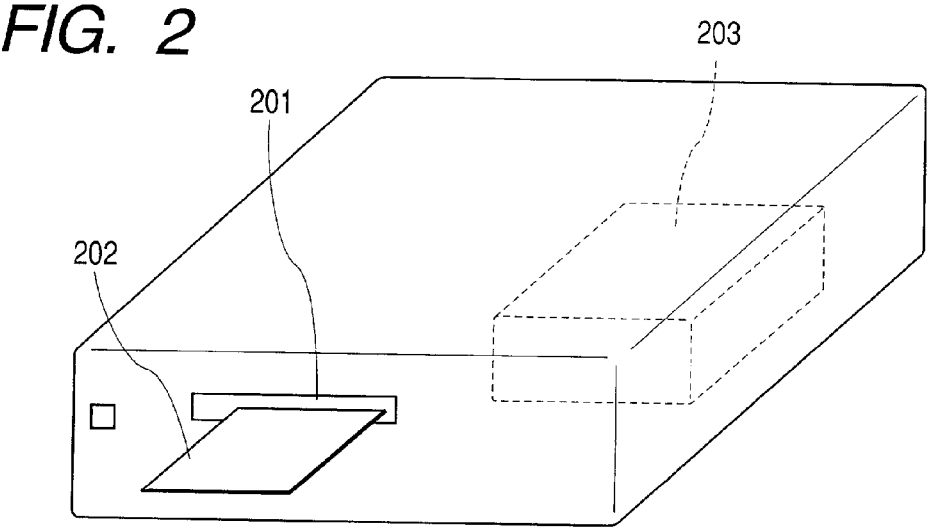
FIG. 2 is an outline diagram depicting an appearance of the binary data storage device of FIG. 1.

FIG. 2 is an outline diagram depicting an appearance of the binary data storage device of FIG. 1.

In FIG. 2, the binary data storage device has a slot 201 provided to its front surface, and it is possible to insert a memory card 202 into this slot 201. The memory card 202 is an external storage medium for recording/storing image data, for example, which is to be used by an image input device such as a digital camera, a digital video camera, a scanner, or the like. When the memory card 202 is inserted into the slot 201, the binary data stored in the memory card 202 is read out by means of a read part 100 inside the slot 201. Accordingly, the binary data which has thus been read out is stored/saved on an HDD 203 being a storage part 102. Further, this storage device is provided with, as well as the above-mentioned slot 201 and the HDD 203, an input part 101, a display part 103 and a control part which includes a CPU 104, a ROM 105 and a RAM 106 which are not depicted in the drawing.

Next, explanation will be made of a process for the binary data storage device depicted in FIG. 1, being a process for storing into the storage part 102 the image data from the inserted memory card 202, the explanation being made making reference to FIG. 3 and FIG. 4. Note that the binary data being saved in the memory card 202 here is still image data, having been captured by means of a digital camera. In this case, the file format stored in the memory card 202 is that of a Design rule for Camera File Device (referred to hereinafter as "DCF file format"), and an example of a directory structure in this DCF file format is illustrated in FIG. 3.

Figure 3:
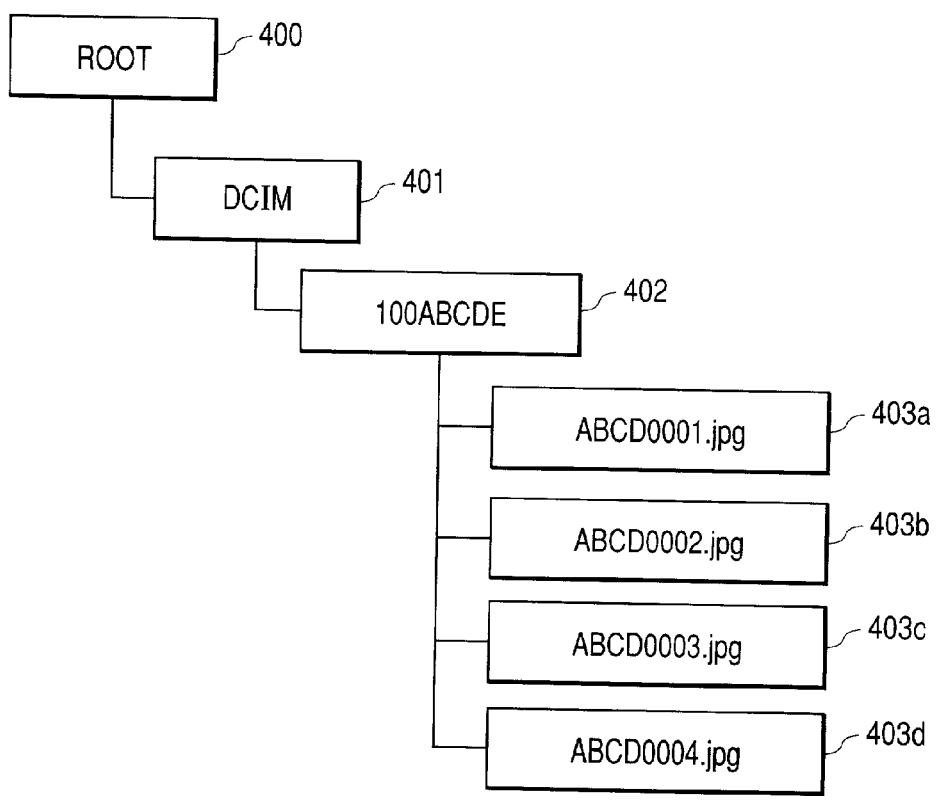
FIG. 3 is an outline diagram depicting a directory structure of binary data stored in a memory card shown in FIG. 2.

FIG. 3 is an outline diagram depicting a directory structure of binary data stored in a memory card 202 shown in FIG. 2.

In FIG. 3, reference numeral 400 is a root directory in the memory card 202, and a DCF image root directory 401 with a directory name "DCIM" is stored directly under this root directory. Below that there is a DCF directory 402 for storing a DCF object (file). Below this DCF directory 402 there are stored a plural number of DCF objects, namely the binary data, which is the still image data. The illustration in FIG. 3 indicates that there are four sets of still image data, that are DCF objects 403a to 403d, being stored.

FIG. 4 is a flow chart depicting a process for duplicating image data from the memory card 202 of FIG. 2 to the storage part 102.

In FIG. 4, the memory card 202 is first inserted into the slot 201 in the binary data storage device (step S301). Next, at step S302, a discrimination is made by means of a discrimination process depicted in FIG. 5 and FIG. 6 described below, as to whether the image data which is the still image data exists inside the memory card 202 or not. When the result of the discrimination in step S302 indicates that the image data does not exist in the memory card 202, the processing of inputting the meta data (step S304) shown in FIG. 7 and FIG. 8 and described below is performed, and the present processing ends.

Figure 9:
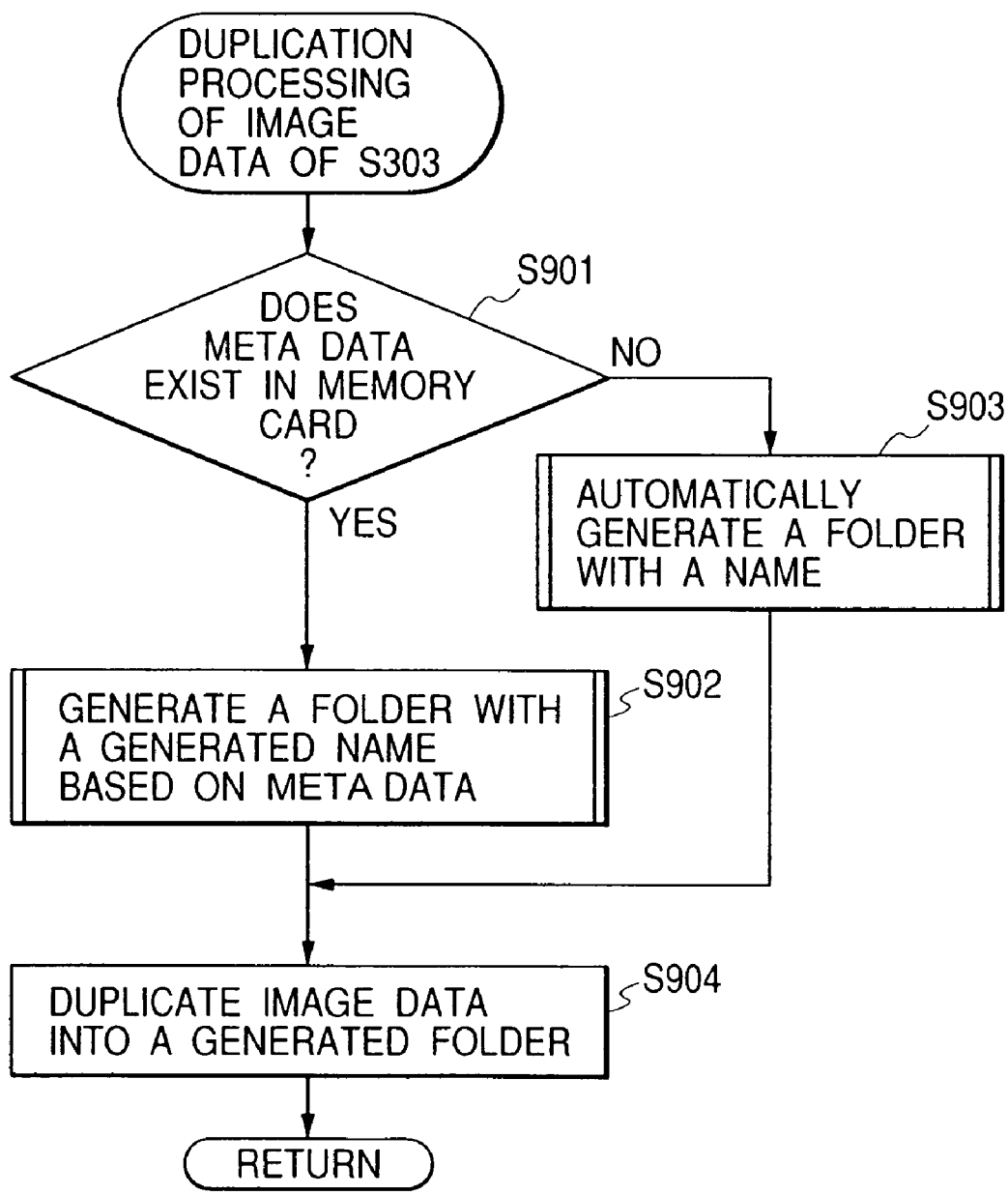
FIG. 9 is a flow chart of a process for duplicating image data, at step S303 depicted in FIG. 4.
Figure 11:
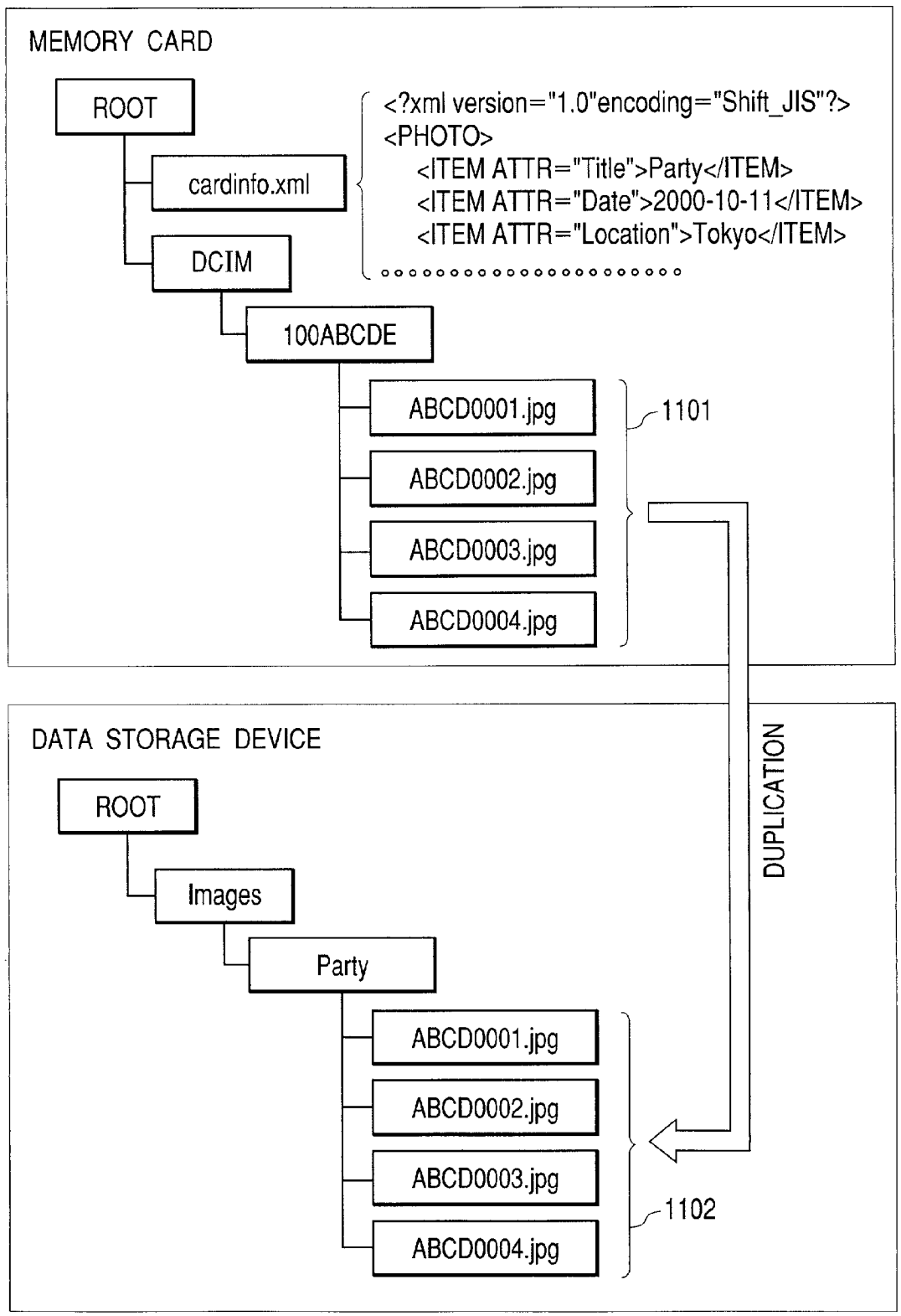
FIG. 11 is an outline diagram depicting results of the image data duplication process at step S303 depicted in FIG. 4.

On the other hand, when the result of the discrimination in step S302 indicates that the image data does exist in the memory card 202, the processing of duplicating the image data (step S303) depicted in FIG. 9 and FIG. 11 is performed, and the present processing ends.

Next, explanation will be made of a processing of confirming the existence of the image data at step S302, which is depicted in FIG. 4, making reference to FIG. 5 and FIG. 6.

Figure 5:
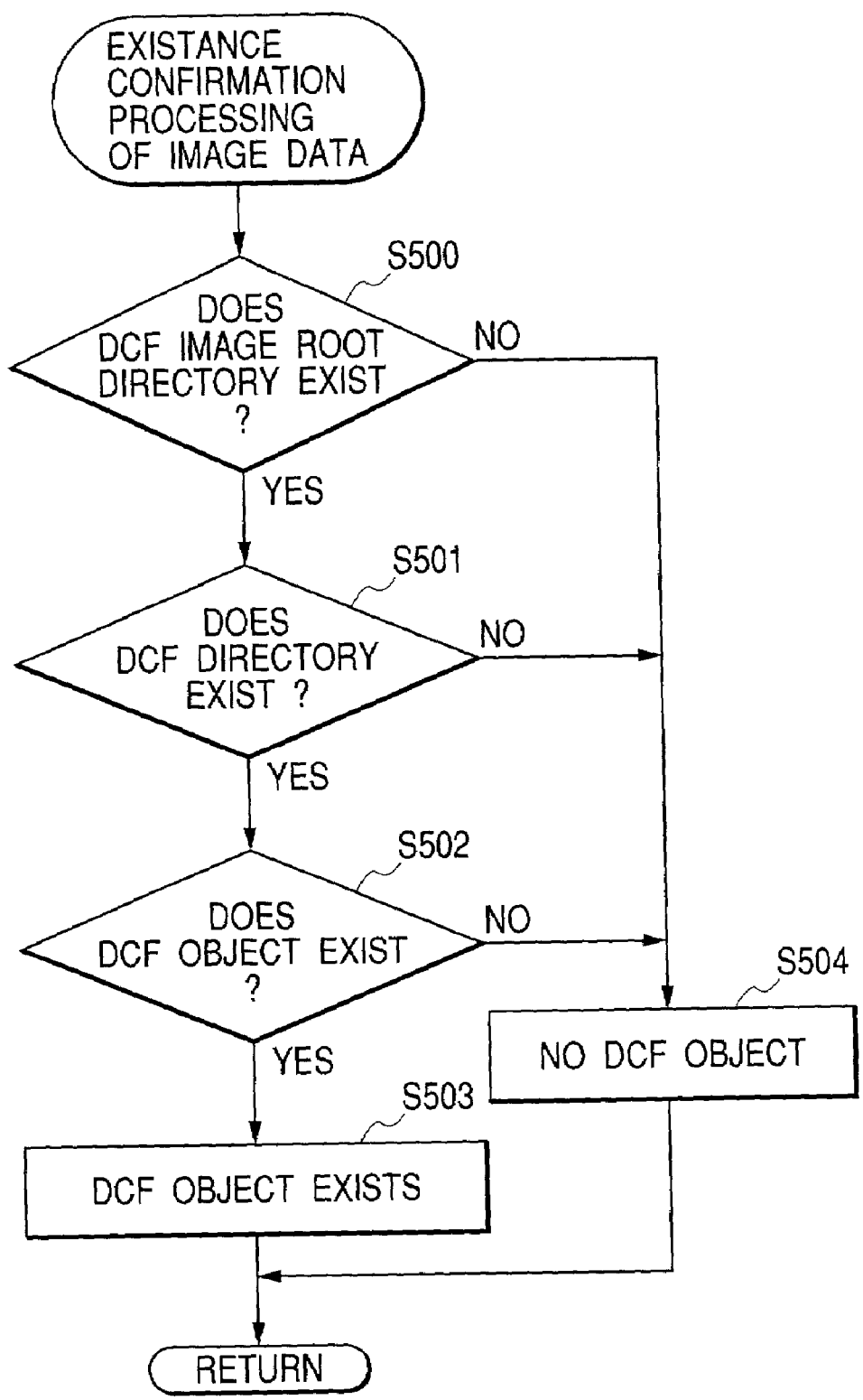
FIG. 5 is a flow chart of a process for confirming existence of image data, at step S302 depicted in FIG. 4.

FIG. 5 is a flow chart of a processing of confirming existence of image data, at step S302 depicted in FIG. 4.

In FIG. 5, a fixed DCF image root directory 401 in the memory card 202 is first searched, and a discrimination is made as to whether the name "DCIM" of this directory 401 exists or not (step S500). When the results of this discrimination indicate that "DCIM" does not exist, the process advances to step S504 and a judgment of no DCF object, that is, a judgment that the still image data does not exist in the memory card 202 is made and the process returns. On the other hand, when "DCIM" does exist, the DCF directory 402 below the DCF image directory 401 is then searched (step S501). At step S501, just as in step S500, a discrimination is made as to whether the DCF directory 402 exists or not, and in the case where the DCF directory 402 does not exist, the process advances to step S504 and returns. However, in the case where the DCF directory 402 does exist, a discrimination is then made at step S502 as to whether the DCF object exists or not. When the results of this discrimination indicate that the DCF object does not exist, then the process advances to step S504 and returns. However, in the case where the DCF object does exist the process advances to step S503, and a judgment that the DCF object exists, that is, a judgment that the still image data does exist in the memory card 202 is made and the process returns. Note that in the present processing is only a judgment as to whether the DCF object 403, namely the still image data, exists or not, so it is not necessary to determine the number of DCF objects 403 at this stage.

Figure 6:
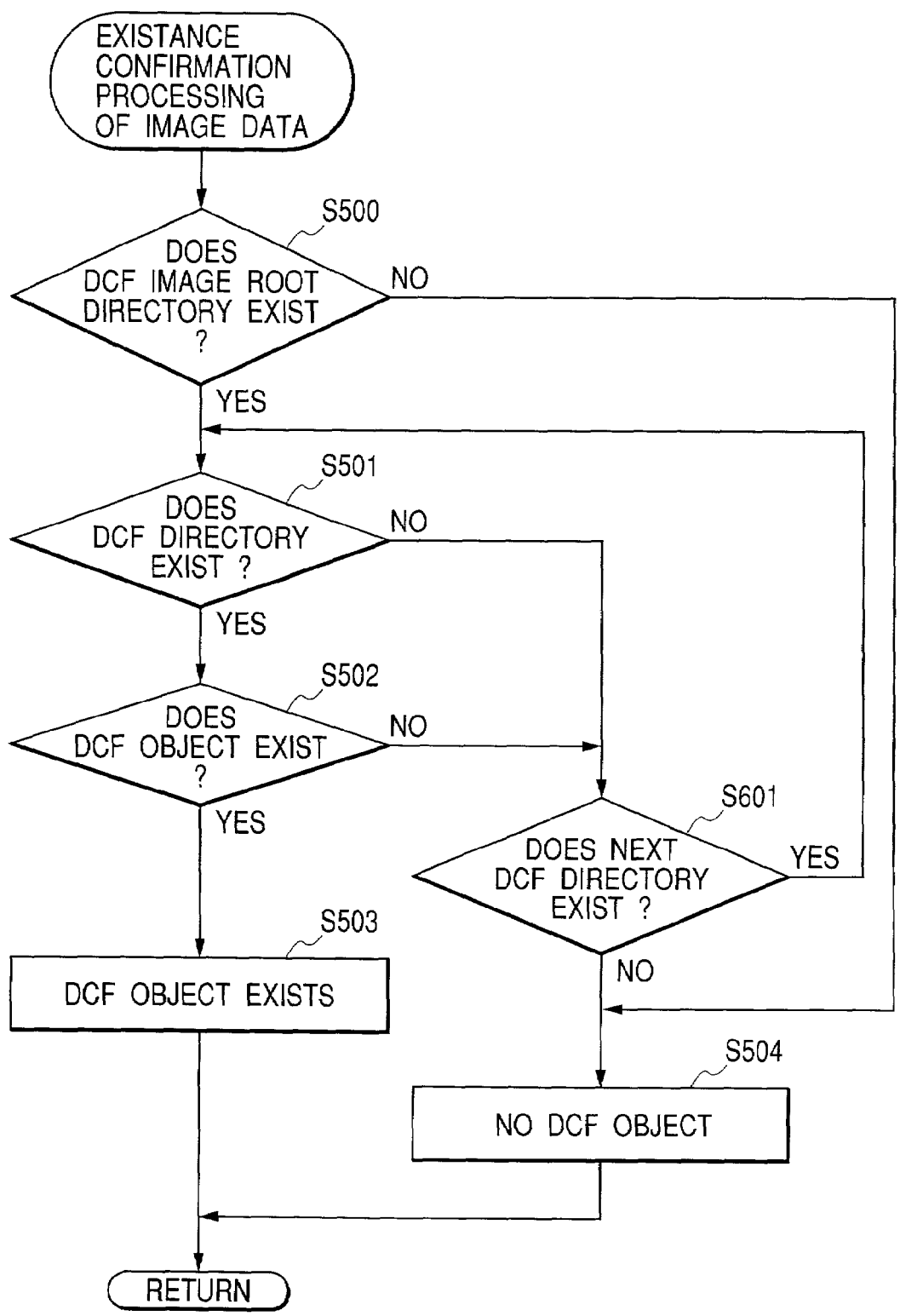
FIG. 6 is a flow chart of another process for confirming the existence of image data, at step S302 depicted in FIG. 4.

On the other hand, in the case where the file format stored in the memory card 202 is the above-mentioned DCF file format, a plurality of DCF directories 402 may be stored directly under the DCF image root directory 401, and a processing in such a case is depicted in FIG. 6.

FIG. 6 is a flow chart of another processing of confirming the existence of image data, at step S302 depicted FIG. 4. Note that in FIG. 6 the same reference numerals are assigned to the steps which perform the same processes as in FIG. 5, and their explanations are omitted.

In FIG. 6, in the case where the DCF directory and the DCF object are determined at step S501 and at step S502, respectively, not to exist (i.e., NO at step S501 and NO at step S502), then a discrimination is made at step S601 as to whether a subsequent DCF directory exists or not, and when this subsequent directory exists a processing of returning to step S501 is added on. Accordingly, it becomes possible to search all of the plurality of DCF directories 402, and determine whether or not there is a DCF object stored in each DCF directory 402.

Next, explanation will be made of a processing of inputting meta data at step S304 in FIG. 4, making reference to FIG. 7 and FIG. 8.

Figure 7:
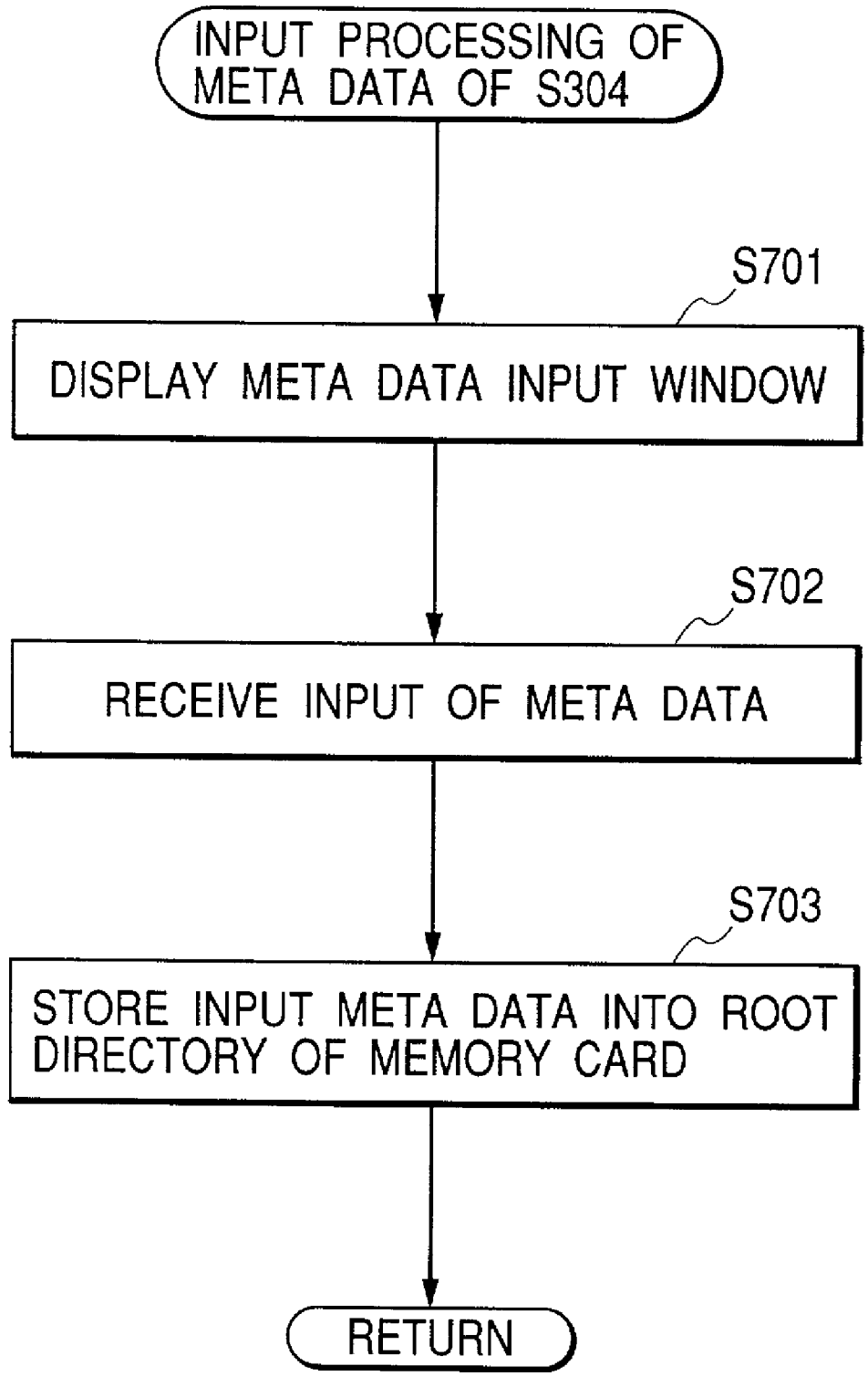
FIG. 7 is a flow chart of a process for inputting meta data, at step S304 depicted in FIG. 4.

FIG. 7 is a flow chart of a processing of inputting meta data, at step S304 depicted in FIG. 4. FIG. 8 is an outline diagram of an input screen displayed on a display part 103, for inputting the meta data in the processing of FIG. 7. In FIG. 8, reference numeral 801 is an event to be photographed, 802 is a date and time of photograph, 803 is a location of photograph, and 804 is a photographer.

At step S701 in FIG. 7 the meta data input screen is displayed on the display part 103 as a meta data input processing. The meta data is comprised, generally, of a date, a person who took the image, and other such data, which is to be attached to the image. Next, the meta data input made by the user is received (step S702). The meta data input is performed for each of the items of "Title", "Date" and the like in FIG. 8 by manipulations of a keyboard and/or mouse, for example. After all of the items have been inputted and the OK button indicated by reference numeral 805 is clicked, the inputted meta data is saved in the root directory 400 of the memory card 202 under the name "cardinfo.xml" (step S703), and the present processing thus ends. The meta data input processing is performed as described above.

Next, explanation will be made of a processing of duplicating the image data at step S303 in FIG. 4, making reference to FIGS. 9 through 11.

FIG. 9 is a flow chart of a processing of duplicating image data, at step S303 depicted in FIG. 4.

At step S901 in FIG. 9 confirmation is made as to whether the meta data exists in the memory card 202 or not, and thus the existence or non-existence is determined. In the present embodiment, the language in which the meta data is described is Extensible Markup Language (XML), and to confirm whether the XML file "cardinfo.xml" exists in the root directory in the memory card 202 or not is sufficient. In the case where the results of this determination indicate that the XML file "cardinfo.xml" did exist, then a judgement is made that there does exist meta data and the process advances to step S902. On the other hand, in the case where the results indicate that the meta data did not exist a judgement is made that there is no meta data, and the process advances to step S903.

At step S902, the "Title" of "cardinfo.xml" is read, and the folder having the same name as the meta data being saved in the "Title" are generated at a predetermined location in the binary data storage device. According to this processing, in the case where there is, for example, the meta data "cardinfo.xml" depicted in FIG. 10, then the folder having the name of "Party" which is written in the "Title" is generated. If a folder with the same name is present in this predetermined location, then numbers are added in sequence to the end of the name of the newly generated folder. Further, in the case where a memory card 202 in which the meta data "Party" is saved is used over and over again, then folders having the names "Party", "Party-2", "Party-3", "Party-4" and so on are generated. The predetermined location where the folder is to be generated may be designated in advance, but it is also possible to designate it as the need arises.

Further, not only is the "Title" (which is "Party") used from "cardinfo.xml", but also the "Date" (i.e., "2000-10-11"), the "Location" (i.e., "Tokyo"), the "Photographer" (i.e., "Kiyoshi Kusama") and the like are also used to indicate, for example, "a photograph taken of a party in Tokyo by Kiyoshi Kusama on Oct., 11, 2000", thus indicating "who" took the picture, "when" and "where" as a complete sentence, and generating a folder having that sentence as its name.

Next, the still image data inside the memory card 202 is duplicated in the folder generated at step S902 (step S904), and the process returns. As a result, the still image data 1101 which is present in the memory card 202 indicated in FIG. 11 is duplicated as still image data 1102 in a folder having the name generated at a predetermined location in the binary data storage device (in the present example the name is "Images".)

On the other hand, when the results of the discrimination made at step S901 indicate that the meta data did not exist, then a folder having the name of "Untitled" is generated in the predetermined location of the binary data storage device. Here, in the same way as in step S902, in the case where a folder having the same name existed in the predetermined location, then a folder is generated with a new number chosen in numerical sequence added to the end of the folder name. Then, at step S904, the still image data is duplicated in the folder with the name "Untitled" which has been generated at the predetermined location in the binary data storage device, and then the process returns.

According to this processing, a folder with a name is automatically generated in the storage part 102 (i.e., in the HDD 203) of the binary data storage device based on the meta data inside the memory card 202, and it becomes possible to duplicate the still image data inside the memory card 202.

According the present embodiment, all of the DCF objects (i.e., the still image data) inside the memory card 202 are copied into the binary data storage device, but when this image data is copied from the memory card 202 it may be automatically deleted from the memory card 202. Further, according to the present embodiment, the information which was used in the meta data is used just as it is to generate the folder name, but it is also possible to use a built-in dictionary function or the like to come up with connotatively or semantically similar words or information to use as the folder name.

According to the present embodiment, explanation has been made of the case in which the format of the file to be stored inside the memory card 202 is the DCF file format; however, even in the case where there is no directory structure having such specific file format it is still possible to perform the above processes. In such a case, the file which is to be recognized as the binary data can be searched from the memory card 202 as, for example, a JPEG file in the case of still image data, or an MPEG file in the case of motion image data.

According to the First Embodiment, the presence of the still image data inside the memory card 202 is confirmed (step S302), and also, the presence of the meta data inside the memory card 202 is confirmed (step S901), the folder having the name based on this meta data is generated in the HDD 203 of the binary data storage device (step S902), the still image data inside the memory card 202 is read out and the still image data is duplicated in the folder which has been generated (step S904); therefore, when the still image data inside the memory card 202 is duplicated (i.e., copied) into or stored in the binary data storage device, the folder having the name being appropriate for that data can be generated inside the binary data storage device without the user performing manipulations or confirming the content of this data.

Second Embodiment

It was explained that, in the above-mentioned First Embodiment, a folder having a name based on the meta data inside the memory card 202 is generated in the binary data storage device. Explanation will be made of the generation of the folder name, according to the Second Embodiment, in the case where the image data is present inside the memory card 202 and the meta data does not exist therein, this explanation being made with reference to FIG. 12 and FIG. 13. Note that the binary data storage device in the Second Embodiment has the same construction as in the above-mentioned First Embodiment, so explanation thereof is omitted here. Hereinafter, explanation will be made only of the points which are different from the First Embodiment.

Figure 12:
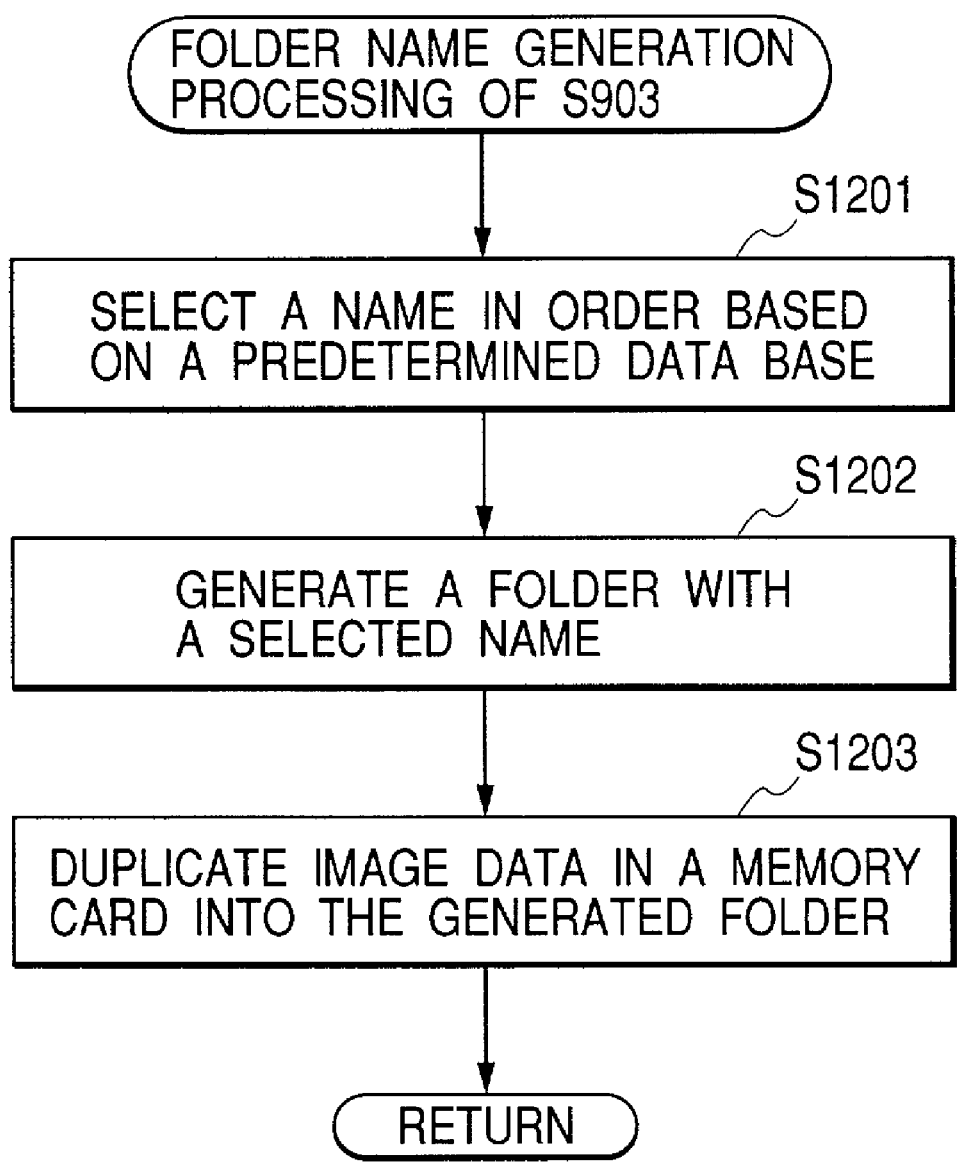
FIG. 12 is a flow chart of a process for generating a folder name, in the binary data storage device according to the Second Embodiment of the present invention.

FIG. 12 is a flow chart of a processing of generating a folder name, in the binary data storage device according to the Second Embodiment of the present invention.

According to FIG. 12, in the case where the meta data was not present in the memory card 202 the name of "Untitled" was uniformly given to the folder in the case of First Embodiment, but at step S1201 in the Second Embodiment, a name is selected in order based on a data base (FIG. 13) prepared in advance in the binary data storage device. Next, at step S1202, a folder having this selected name is generated at a predetermined location in the binary data storage device, and at step S1203 the image data inside the memory card 202 is duplicated into the generated folder having this name.

In the present embodiment, the bland and dry folder name "Untitled" which was given in the First Embodiment becomes a specific name, and it thus becomes easy to handle the folder even without having to assign a name to it. Further, in the Second Embodiment the example was given of selecting a folder name in order based on a data base which has been prepared in advance; however, it is also possible to assign appropriate names in a random fashion.

According to the Second Embodiment, when the still image data exists in the memory card 202 but the meta data does not, the folder is generated having the name selected in order based on the data base which has been prepared in advance (step S1201 and step S1202), and the still image data is duplicated into the generated folder (step S1203); therefore, when the still image data inside the memory card 202 is duplicated (i.e., copied) into or stored in the binary data storage device, the folder having the name being appropriate for that data can be generated inside the binary data storage device without the user performing manipulations or confirming the content of this data.

Third Embodiment

It was explained that, in the above-mentioned First Embodiment and Second Embodiment, folders are generated in the binary data storage device having names based on the meta data inside the memory card 202 and based on the data base.

Explanation will be made of the generation of the folder name, according to the Third Embodiment, in the case where the still image data is present inside the memory card 202 and the meta data of each set of the still image data is also present therein, this explanation being made with reference to FIG. 14 and FIG. 15. Note that the binary data storage device in the Third Embodiment has the same construction as in the above-mentioned the First Embodiment, so explanation thereof is omitted here. Hereinafter, explanation will be made only of the points which are different from the First Embodiment.

Figure 14:
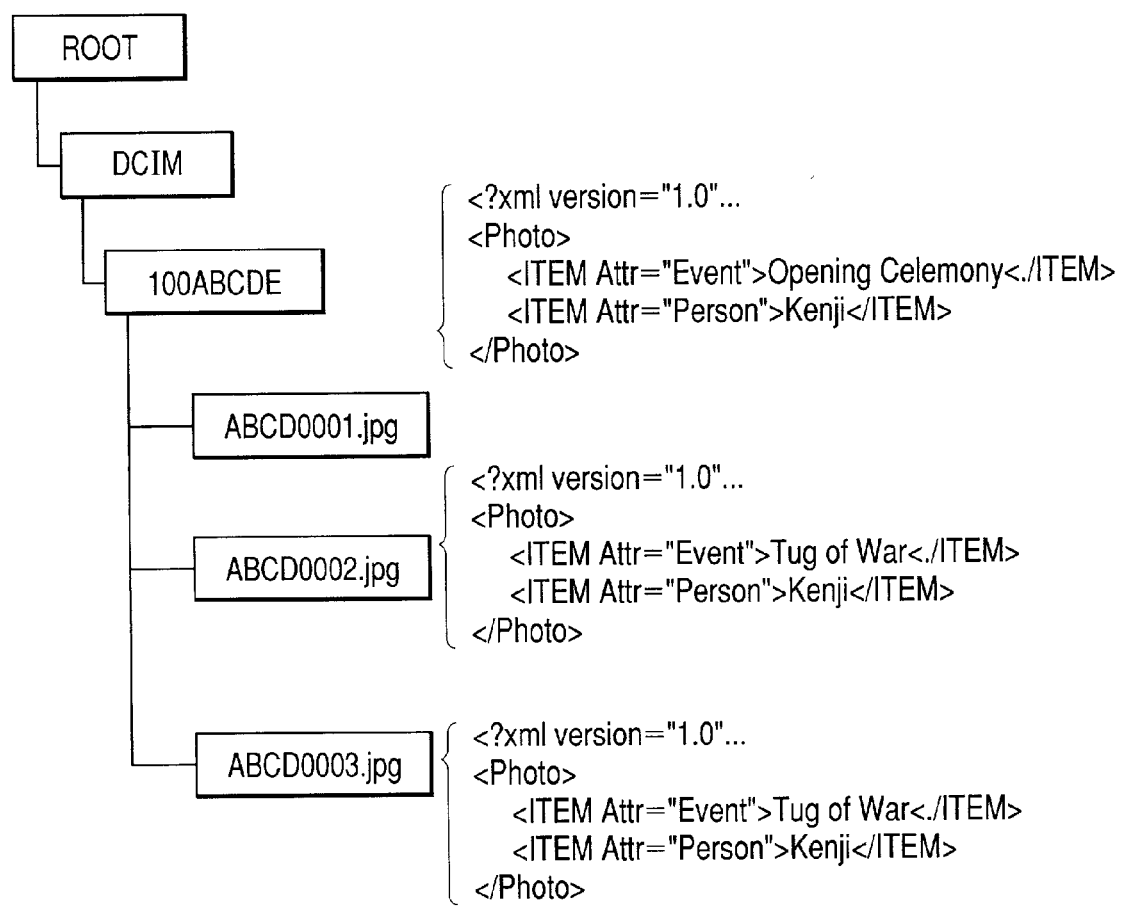
FIG. 14 is a diagram depicting a construction of image data inside the memory card.
Figure 15:
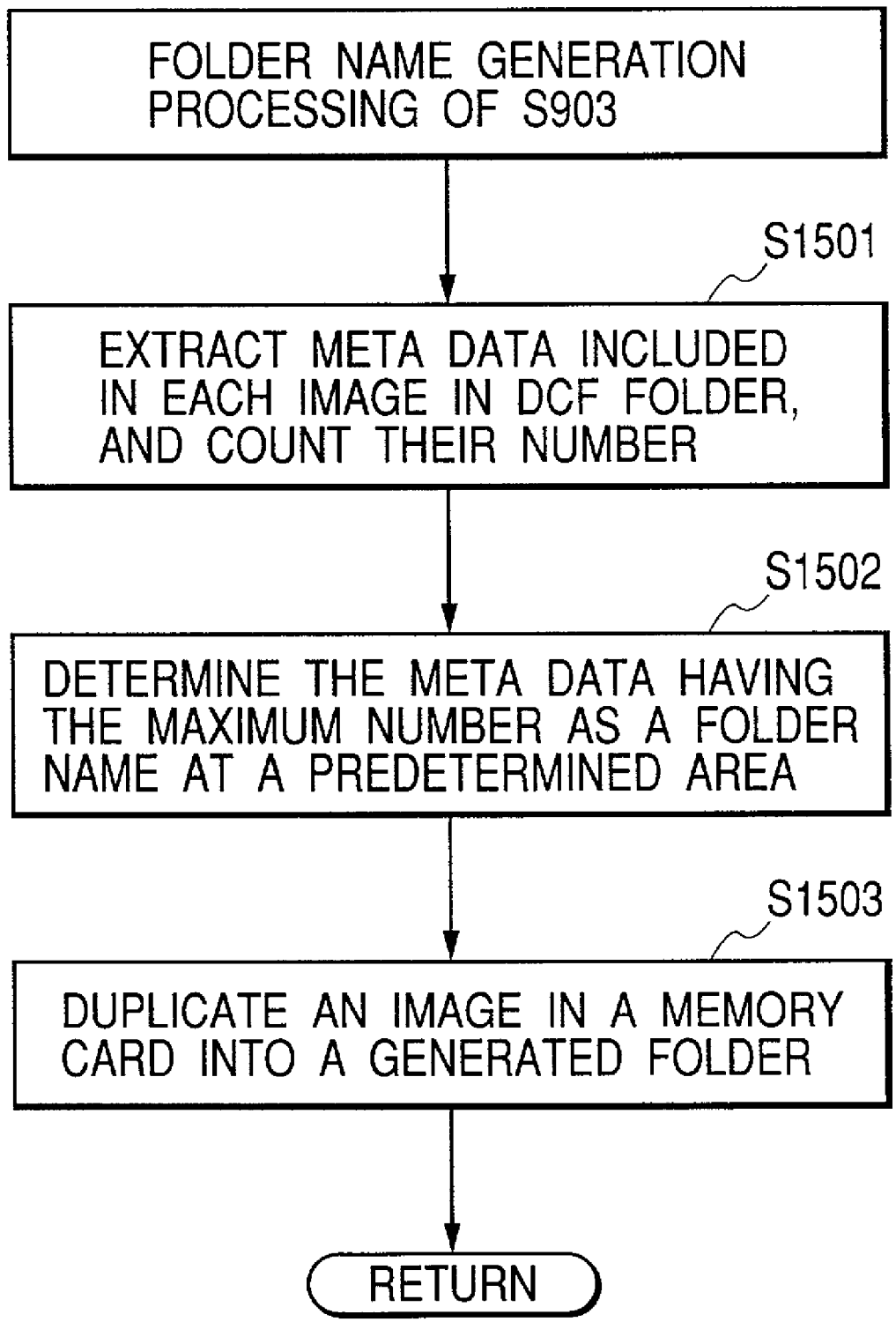
FIG. 15 a flow chart of a folder name generation process according to the Third Embodiment.

FIG. 14 depicts a construction of the image data inside the memory card 202, and meta data written in XML is attached to each set of image data. In the memory card 202 the Cardinfo.xml meta data is not present. Here, the meta data written in XML may be stored in a JPEG file application marker APP4 or the like inside each of the sets of image data, for example, and it is also possible to save this meta data written in XML as a separate file from the image file.

In the First Embodiment and the Second Embodiment, in the case where the meta data "cardinfo.xml" did not exist, a different name was given to the folder to generate the folder name. FIG. 15 is a flow chart explaining a method of generating a folder name in the case where the meta data of each set of image data does exist. At step S1501, all of the image files inside the DCF folder inside the folder are first confirmed, and the number of pieces of meta data included therein is confirmed. That is, according to the example in FIG. 14, "Kenji"=3, "Opening Ceremony"=1 and "Tug of War"=2. Next, at step S11502, the most common meta data becomes the folder name, and this is generated at a predetermined location. According to the example in FIG. 14, "Kenji" is the most common, so a folder having the name of "Kenji" is generated. If there already exists a folder with the name of "Kenji" in the predetermined location, then folders having the names of "Kenji-2", "Kenji-3", and so on are created. It is possible to designate in advance the predetermined location where the folder is to be generated, but it is also possible to designate this location at the time when the need arises.

At the final step, step S1503, all of the images inside the memory card are copied to the generated folder.

According to the present embodiment, the meta data attached to each of the images is effectively used and the meta data which is used the most becomes the folder name, which produces the advantage that the content of the folder can be easily imaged based on the folder name.

In the present embodiment, only the common meta data was used for the folder name; however, in the case where more than one meta data have been used exactly the same number of times, all of these meta data may be used to generated the folder name.

In the present embodiment, only the most frequently used meta data was used for the folder name; however, it is also possible to use meta data which is of a superior rank for the folder name.

Fourth Embodiment

Explanation was made of methods for completely automatically determining the file name, according to the above-mentioned First, Second and Third Embodiments. Explanation will now be made of an operation for the user to generate the folder name manually, according to the Fourth Embodiment, making reference to FIG. 16 and FIG. 17. Note that the binary data storage device in the Fourth Embodiment has the same construction as in the above-mentioned First Embodiment, so explanation thereof is omitted here. Hereinafter, explanation will be made only of the points which are different from the First Embodiment.

In the Third Embodiment a method was shown of generating a folder in the case where meta data is attached to each image.

Figure 16:
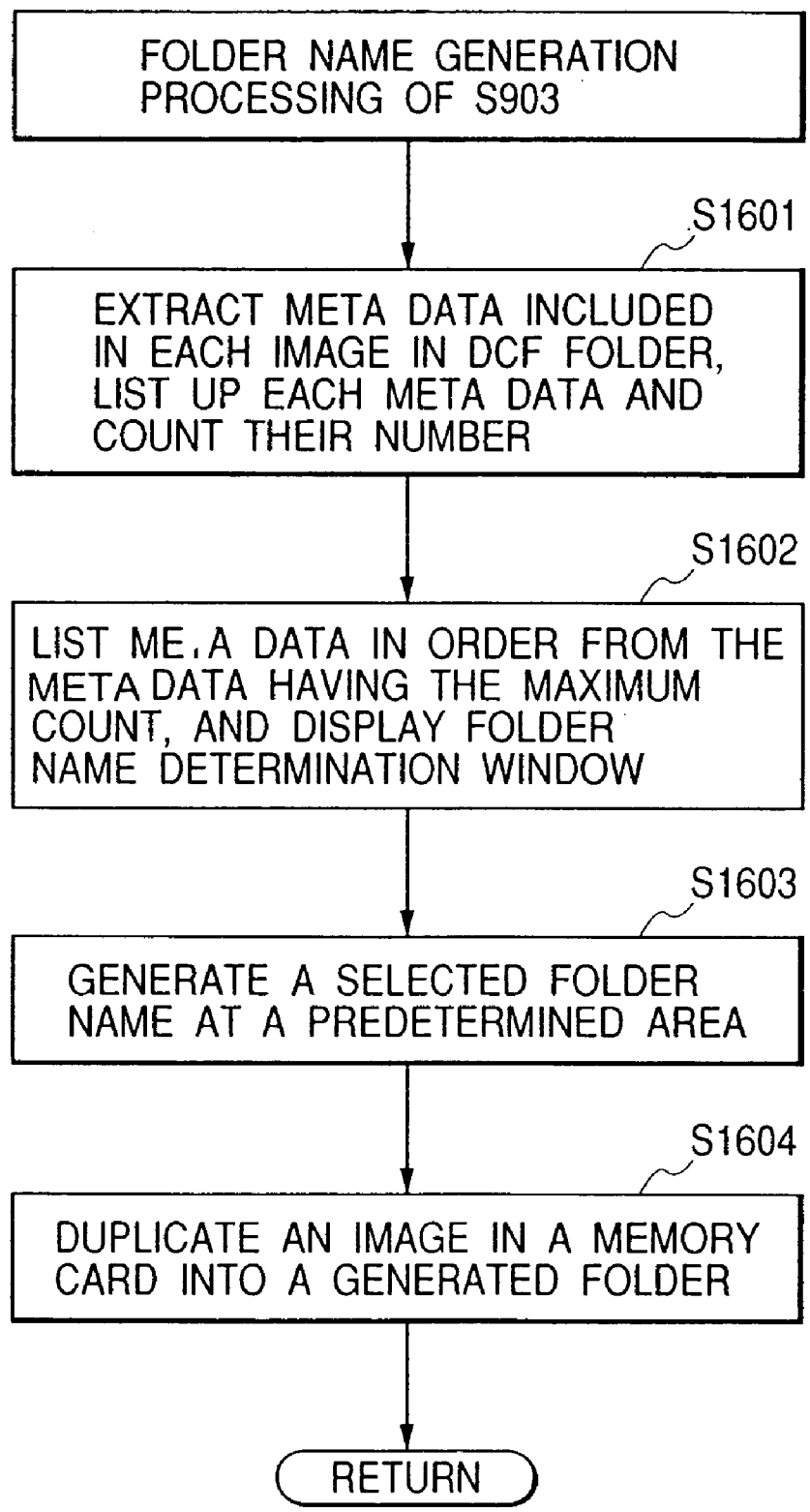
FIG. 16 is a flow chart of a folder name generation process according to the Fourth Embodiment.

In the Fourth Embodiment, too, explanation will be made of a method of generating a folder in the case where the meta data is attached to each of the images, with reference being made to the flow chart of FIG. 16.

Figure 17:
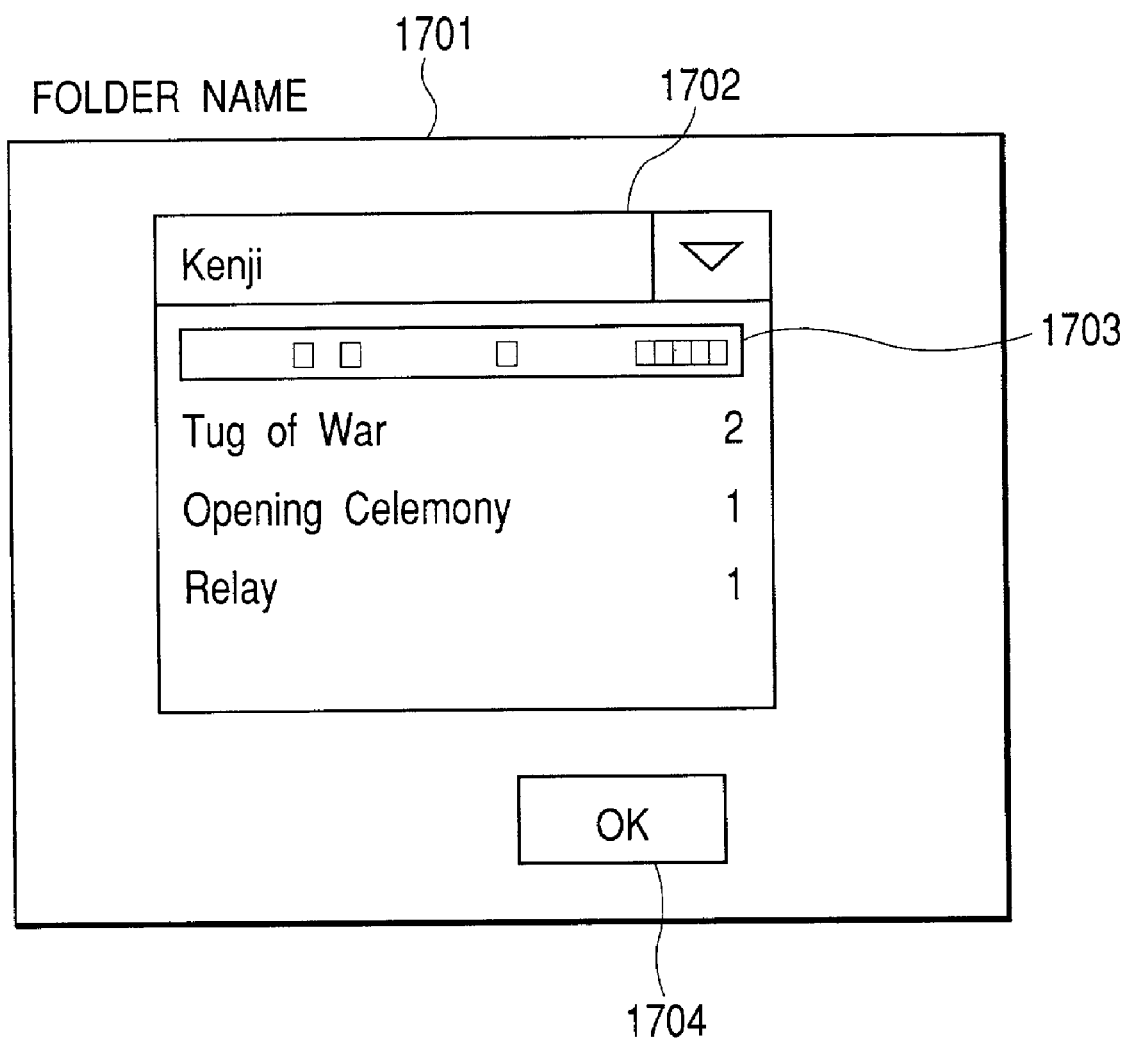
FIG. 17 is an example of a display screen according to the Fourth Embodiment.

At step S1601, the meta data included in the individual images inside the DCF folder are first extracted, each meta data is listed up, and the quantity thereof is counted. At step S1602, the meta data are displayed to the user in order of greatest number thereof. FIG. 17 depicts the display screen at this time.

Reference numeral 1701 is an appellation of a meta data which is a selected candidate to become the folder name, and reference numeral 1702 is the list showing the extracted meta data. Also, reference numeral 1703 is the number or quantity of the meta data, which is arranged in sequence according to greatest number. When the user selects the meta data which the user is interested in from the list 1702 on the screen in FIG. 17 and presses on an "OK" button 1704, and the process advances to step S1603.

At step S1603, the folder of the folder name selected at step S1602 is generated at a predetermined location. In the case where there already exists a folder with the same folder name at that predetermined location, the numerals "2", "3" and so on are added to the end of the folder name and the folder is thus generated.

At the final step, step S1604, all of the images in the memory card are copied into the generated folder.

According to the present embodiment, it is possible for the user to generate the folder with his or her own intentions reflected in the folder name.

In the above-mentioned First, Second, Third and Fourth Embodiments explanation has already been made of the case in which the binary data stored inside the memory card 202 is still image data; however, it goes without saying that even when voice/music data or motion image data is stored the same processing can be performed. Further, the memory card 202 may be a PC card, a compact flash card, a SmartMedia™, a MultiMedia Card™, an SD Card™, a Memory Stick™ or other such semiconductor memory, or a floppy disk, a magnetic card or other such magnetic memory, or an MO, a CD, an RW, a PD, a DVD, a RAM, an MD or other such disk-type storage medium, or may also be a removable hard disk or other such storage medium.

Further, the meta data is, as described above, data description language and in the above-mentioned the First and Second Embodiments XML was used, but another language, such as Standard Generalized Markup Language (SGML) or Hypertext Markup Language (HTML) may also be used.

Other Embodiments

A program being stored in the ROM 105 inside the binary data storage device and being for executing a control method for realizing the First Embodiment and the Second Embodiment may be stored in a freely selected removable storage medium and this storage medium may be attached from an external point, producing the result that this program is provided to the CPU 104 and executed. The storage medium for providing this program may be, for example, a floppy disk, a hard disk, an optical disk, an optical magnetic disk, a CD-ROM, a CD-R, a magnetic tape, a non-volatile memory card or the like. Further, in place of the CPU 102 it is possible to realize the above-mentioned embodiments by means of a circuit (not shown) which performs operations similar to these.

The binary data storage device may be a PC, and an Operating System (OS) or the like running on the PC may execute a part or all of the above-mentioned program. Additionally, the program provided by the freely selected, removable storage medium is written into a memory (not shown) which is provided to function extension board (not shown) which has been inserted into the PC, or to a function extension unit (not shown) which is connected to the PC, and after that, the CPU and such (not shown), which are provided to this function extension board or function extension unit, execute a part or all of this program.

As is explained in detail above, according to the present invention, the existence of the binary data inside the external storage medium and the meta data inside the external storage medium is confirmed, the folder having the folder name based on this meta data is generated inside the data storage device and the binary data is duplicated into the generated folder; so therefore, when the binary data inside the external storage medium is duplicated into the data storage device, it is possible to generate a folder name for the duplication of the data without the user having to perform manipulations or confirm the content of this data.

Further, according to the present invention, in the case where the meta data did not exist in the external storage medium, a folder is generated having a name selected in order based on a data base which has been prepared in advance, or having a name which is selected randomly and the binary data is duplicated into the generated folder; so therefore, when the binary data inside the external storage medium is duplicated into the data storage device, it is possible to generate a folder name for the duplication of the data without the user having to perform manipulations or confirm the content of this data.

What is claimed is:

1. A data storage method of storing content data files stored in a folder in an external data storage medium into a folder in a memory of a data storage device, the method comprising:
   a meta data finding step of finding meta data corresponding to each of the content data files to be stored;
   an extracting step of extracting a common element from sets of the meta data found in the meta data finding step;
   a folder generation step of generating in the memory of the data storage device a new folder having a name including an extracted common element changed from a name of the folder in the external data storage medium; and
   a content data storage step of storing the content data files in the new folder.

2. A data storage method according to claim 1, wherein in the folder generation step, in a case where the meta data does not exist, the folder is generated with a name selected in order based on a data base which has been prepared in advance.

3. A data storage method according to claim 1, wherein, in the folder generation step, in the case where the meta data does not exist, the folder is generated with a name that is randomly selected based on a data base which has been prepared in advance.

4. A data storage method according to claim 1, wherein the meta data are written in a data description language.

5. A data storage method according to claim 4, wherein the data description language is any one of: XML, SGML and HTML.

6. A data storage device for storing content data files stored in a folder in an external data storage medium into a folder in a memory of said data storage device, the device comprising:
- meta data finding means for finding meta data corresponding to each of the content data files;
- extracting means for extracting a common element from sets of the meta data found by the meta data finding means;
- folder generation means for generating in the memory of the data storage device a new folder having a name including an extracted common element changed from a name of the folder in the external data storage medium; and
- content data storage means for storing the content data files into the new folder with the file folder name.

7. A data storage device according to claim 6, wherein in a case where the meta data does not exist, said folder generation means generates a folder with a name selected in order based on a data base which has been prepared in advance.

8. A data storage device according to claim 6, wherein in the case where the meta data does not exist, said folder generation means generates a folder having a name that is randomly selected based on a data base which has been prepared in advance.

9. A data storage device according to claim 6, wherein the data is still image data.

10. A data storage device according to claim 6, wherein the data is voice/music data.

11. A data storage device according to claim 6, wherein the data is motion image data.

12. A data storage device according to claim 6, wherein the meta data is written in a data description language.

13. A data storage device according to claim 12, wherein the data description language is any one of: XML, SGML and HTML.

14. A data storage device according to claim 6, wherein the content data files include one of still image data, moving image data, and audio data, each of those data formats being a binary format.

15. A computer-readable storage medium storing a program for executing a method for storing content data files stored in a folder in an external data storage medium in a memory of a data storage device, the program comprising:
- a meta data finding module for finding meta data corresponding to each of the content data to be stored;
- an extracting module of extracting a common element from sets of meta data found in the meta data finding module;
- a folder generation module for generating in the memory of the data storage device a new folder having a name including an extracted common element changed from a name of the folder in the external data storage medium; and
- a content data storage module for storing the content data files into the new folder with the file folder name.

16. A computer-readable storage medium according to claim 15, wherein in a case where the meta data does not exist, the folder generation module generates a folder having a name selected in order based on a data base which has been prepared in advance.

17. A computer-readable storage medium according to claim 15, wherein in the case where the meta data does not exist, the folder generation module generates a folder having a name that is randomly selected based on a data base which has been prepared in advance.

18. A computer-readable storage medium according to claim 15, wherein the content data files include one of still image data, moving image data, and audio data, each of those data formats being a binary format.

19. A data storage device for storing content data files stored in a folder in an external data storage medium in a memory of the data storage device, the device comprising:
- a meta data finder which finds an existence of meta data corresponding to each of the content data files to be stored;
- an extractor which extracts a common element from sets of meta data found by the meta data finder;
- a folder generator which generates a new folder in the memory of the storage device, the new folder having a name including an extracted common element changed from a name of the folder in the external storage medium; and
- a memory which stores the content data files in the new folder with the file folder name.

20. A data storage method according to claim 1, wherein the content data files include one of still image data, moving image data, and audio data, each of those data formats being a binary format.

21. A data storage device according to claim 19, wherein the content data files include one of still image data, moving image data, and audio data, each of those data formats being a binary format.

* * * * *